United States Patent
Temple et al.

(10) Patent No.: US 8,716,402 B2
(45) Date of Patent: May 6, 2014

(54) BARRIER COATING COMPRISING A POLYURETHANE DISPERSION AND ELASTOMERIC MATERIAL

(76) Inventors: Rodger G. Temple, Sarver, PA (US); Brian E. Woodworth, Pittsburgh, PA (US); Diep Nguyen, Wexford, PA (US); Michelle S. Miles, Mercer, PA (US); Walter F. Kasper, Gibsonia, PA (US); Dennis L. Faler, Glenshaw, PA (US)

( * ) Notice: Subject to any disclaimer, the term of this patent is extended or adjusted under 35 U.S.C. 154(b) by 162 days.

(21) Appl. No.: 12/728,585

(22) Filed: Mar. 22, 2010

(65) Prior Publication Data

US 2010/0174032 A1 Jul. 8, 2010

Related U.S. Application Data

(63) Continuation of application No. 11/072,832, filed on Mar. 4, 2005, now abandoned.

(60) Provisional application No. 60/550,491, filed on Mar. 5, 2004.

(51) Int. Cl.
 C09D 175/12 (2006.01)
 C08L 75/12 (2006.01)
 C08G 18/32 (2006.01)
 C08G 18/42 (2006.01)

(52) U.S. Cl.
 USPC ............... 525/128; 428/423.1; 428/424.2; 428/424.7; 524/591; 524/839; 524/840; 525/123; 525/127; 525/453; 525/455

(58) Field of Classification Search
 USPC ......... 428/423.1, 424.2, 424.7; 524/591, 839, 524/840; 525/123, 127, 453, 455, 128
 See application file for complete search history.

(56) References Cited

U.S. PATENT DOCUMENTS

| | | |
|---|---|---|
| 4,408,034 A | 10/1983 | Kazama et al. |
| 4,788,269 A | 11/1988 | Vu et al. |
| 4,928,741 A | 5/1990 | Rye et al. |
| 5,005,625 A | 4/1991 | Klemmensen et al. |
| 5,091,467 A | 2/1992 | Beers |
| 5,153,061 A | 10/1992 | Cavagna et al. |
| 5,229,207 A | 7/1993 | Paquette et al. |
| 5,232,754 A | 8/1993 | Waugh |
| 5,912,299 A | 6/1999 | Tomko et al. |
| 5,945,473 A | 8/1999 | Kielbania et al. |
| 6,013,340 A | 1/2000 | Bonk et al. |
| 6,022,925 A | 2/2000 | Tomko et al. |
| 6,082,025 A | 7/2000 | Bonk et al. |
| 6,106,950 A | 8/2000 | Searle et al. |
| 6,130,308 A | 10/2000 | Rink et al. |
| 6,203,868 B1 | 3/2001 | Bonk et al. |
| 6,342,280 B1 | 1/2002 | Patrick et al. |
| 6,391,405 B1 | 5/2002 | Bonk et al. |
| 6,569,533 B1 | 5/2003 | Uchida et al. |
| 6,582,786 B1 | 6/2003 | Bonk et al. |
| 6,599,597 B1 | 7/2003 | Bonk et al. |
| 6,649,688 B1 | 11/2003 | Mayer et al. |
| 2003/0229194 A1 | 12/2003 | Nomura et al. |
| 2005/0084686 A1* | 4/2005 | Imaizumi ............... 428/425.5 |

FOREIGN PATENT DOCUMENTS

| | | |
|---|---|---|
| EP | 0829507 A2 | 3/1998 |
| EP | 1081170 A2 | 3/2001 |
| EP | 1369443 A2 | 12/2003 |
| JP | 2003206401 A | 7/2003 |
| WO | 9856598 A1 | 12/1998 |
| WO | 03046095 A1 | 6/2003 |

OTHER PUBLICATIONS

Kroschwitz, Jacqueline; Editor; Concise Encyclopedia of Polymer Science and Engineering; John Wiley & Sons; New York; 1990; pp. 1233-1236.*

* cited by examiner

*Primary Examiner* — Rabon Sergent
(74) *Attorney, Agent, or Firm* — Julie W. Meder; Diane R. Meyers

(57) ABSTRACT

A barrier coating comprising a polyurethane dispersion and an elastomeric material is disclosed. The polyurethane comprises at least 30 weight percent of meta-substituted aromatic material. Methods for improving barrier using the coatings are also disclosed.

20 Claims, No Drawings

BARRIER COATING COMPRISING A POLYURETHANE DISPERSION AND ELASTOMERIC MATERIAL

CROSS REFERENCE TO RELATED APPLICATIONS

This application is a continuation application of U.S. patent application Ser. No. 11/072,832, filed Mar. 4, 2005, abandoned, which claims priority to U.S. Provisional Application No. 60/550,491, filed Mar. 5, 2004.

FIELD OF THE INVENTION

The present invention relates to barrier coatings comprising a polyurethane dispersion and an elastomeric material.

BACKGROUND INFORMATION

For many substrates used in a variety of industries, barrier protection, such as protection against vapor, gas and/or chemical ingress and/or egress, is often desired. For example, thermoplastic and thermoset polymeric materials are widely used substrates through which gases, such as oxygen and carbon dioxide, can be readily permeated. This is particularly true of most of the plastic materials commonly used by the packaging industry. Some oxygen-sensitive products may become discolored and/or spoiled upon even minute exposure to oxygen, and carbonated beverages can lose their carbonation or become "flat" if carbon dioxide is removed. Bladders, such as those used in sporting equipment including shoes and balls, are similarly permeable to gas. The materials used in tires are also permeable to gases, and resistance to gas and moisture permeation is typically desired. Often, coatings used for increasing the barrier of these substrates can have a negative effect on the flexibility and/or elasticity of the substrate. Improved barrier coatings, particularly those in which flexibility and/or elasticity are not significantly sacrificed, are therefore desired.

SUMMARY OF THE INVENTION

The present invention is directed to a barrier coating comprising a polyurethane comprising at least 30 weight percent of meta-substituted aromatic material, and an elastomeric material. The present invention is further directed to methods for using the barrier coatings described herein.

DETAILED DESCRIPTION OF THE INVENTION

The present invention is directed to a barrier coating comprising a polyurethane comprising at least 30 weight percent of meta-substituted aromatic material and an elastomeric material. The weight percent is based on the total solid weight of the resin. "Polyurethane" as used herein refers to compounds having urethane linkages and/or urea linkages.

As used herein, "barrier coating" refers to a coating that imparts vapor barrier, gas barrier and/or chemical barrier to a substrate. "Vapor barrier" refers to a barrier and/or low permeability to liquid and/or its vapor. "Gas barrier" refers to a barrier and/or low permeability to oxygen, nitrogen, carbon dioxide and/or other gases. "Chemical barrier" refers to a barrier and/or low permeability to the migration of a molecule from one substrate to another, and/or from within one substrate to its surface. Any resistance to permeation of vapor, gas and/or chemical(s) is sufficient to qualify the coating as a "barrier coating" according to the present invention. The gas barrier properties of a substrate, and/or any coatings thereon, are typically described in terms of the oxygen permeability constant ("P(O$_2$)"). The "P(O$_2$)" number quantifies the amount of oxygen that can pass through a substrate and/or coating under a specific set of circumstances and is generally expressed in units of cm$^3$-mil/100 inches$^2$/atmosphere/day. This is a standard unit of permeation measured as cubic centimeters of oxygen permeating through one mil (25.4 micron) thickness of a sample, 100 square inches (654 square centimeters) in an area, over a 24 hour period, under a partial pressure differential of one atmosphere at a specific temperature and relative humidity (R.H.) conditions.

As noted above, at least 30 weight percent of the polyurethane used in the present barrier coating is meta-substituted aromatic material. The meta-substituted aromatic material can be introduced through components of the polyurethane pre-polymer, or through chain extenders reacted with the polyurethane pre-polymer. Components that contribute barrier may have a negative effect on flexibility and/or elasticity of a substrate; the needs of the user will help to determine the desired level of barrier, flexibility and/or elasticity. The percent of meta-substituted aromatic material can be determined, for example, by adding the weight of all the monomers containing meta-substituted aromatic material, dividing that number by the total solid weight of the final resin and multiplying by 100.

In one embodiment of the present invention, the polyurethane comprises a polyester polyol. In another embodiment of the present invention, the polyester polyol has a Molar Permachor Number of at least 35, such as 39 or higher. "Molar Permachor Number" and like terms refer to the number calculated from the chemical structure of the polymer; each atom or group of atoms in side chains or the backbone has a value from the Master Table of Segmental Permachor Values, which Table can be found, for example, in "Properties of Polymers" by D. W. Van Krevelan, 3$^{rd}$ Ed., Elsevier, (1990). The values are then used to get the Permachor Number, according to methods known to those skilled in the art, which are also discussed in "The Use of Barrier Polymers in Packaging" by Morris Salame, Polysultants Co.

In certain nonlimiting embodiments of the invention, the polyester polyol Molar Permachor Number of at least 35 is achieved by preparing a polyester polyol from a polyol comprising an ether moiety and a carboxylic acid or anhydride. Suitable ether polyols include, for example, diethylene glycol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; also poly(tetrahydrofuran). Suitable dicarboxylic acids include but are not limited to glutaric acid, succinic acid, malonic acid, oxalic acid, phthalic acid, isophthalic acid, hexahydrophthalic acid, adipic acid, maleic acid, and mixtures thereof. Anhydrides of these and any other carboxylic acids can also be used. In certain nonlimiting embodiments, the polyester polyol has greater than eight carbon atoms.

The polyester polyol can be prepared according to any method known in the art. For example, the polyol and carboxylic acid/anhydride can be heated together while removing the water generated by esterification until a desired acid number is achieved.

The polyester polyol can then be reacted with isocyanate to form a polyurethane. The polyurethane can be formed according to any method known in the art, such as by heating the polyol with an isocyanate until a desired NCO equivalent weight is achieved. Any isocyanate can be used according to the present invention; examples include, but are not limited to, isophorone diisocyanate (IPDI), dicyclohexylmethane 4,4'-diisocyanate ($H_{12}$MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and combinations thereof.

The polyurethane can then be chain extended to build molecular weight using, for example, any chain extension agent having more than one reactive functional group. Examples include polyols, polyamines, polythiols, or other compounds having reactive functional groups, such as hydroxy groups, thiol groups, amine groups, carboxylic acids, and acetylacetonate protons. Suitable polyol chain extenders include, but are not limited to: 1,6-hexanediol; cyclohexanedimethanol; 2-ethyl-1,6-hexanediol; 1,4-butanediol; ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol; 1,4-butanediol; neopentyl glycol; dihydroxyalkylated aromatic compounds such as the bis (2-hydroxyethyl) ethers of hydroquinone and resorcinol (HER); p-xylene-α,α'-diol; the bis (2-hydroxyethyl) ether of p-xylene-α,α'-diol; m-xylene-α,α'-diol and the bis (2-hydroxyethyl) ether, trimethylol propane, 1,2,6-hexantriol, glycerol, and mixtures thereof. Suitable polyamine extenders include, but are not limited to, p-phenylenediamine, m-phenylenediamine, benzidine, 4,4'-methylenedianiline, 4,4'-methylenibis (2-chloroaniline), ethylene diamine, m-xylylenediamine (MXDA) and combinations of these. Other typical chain extenders are amino alcohols such as ethanolamine, propanolamine, and butanolamine. Acidic chain extenders include 2,2-bis(hydroxymethyl)propionic acid (DMPA), 2,2-bis(hydroxymethyl)butyric acid, and diphenolic acid. Other suitable chain extenders and combinations of chain extenders are also within the scope of the present invention.

Isocyanates can also be used, such as any of those listed above, to further chain extend the molecule and/or impart desired properties.

Chain extension can be accomplished by means standard in the art. For example, the chain extenders can be heated in a flask and the polyurethane added thereto. In certain nonlimiting embodiments, it may be desired to neutralize a chain extended polyurethane having acidic functionality to increase stability of the polyurethane when it is dispersed in water. Any amine or other neutralizing agent can be used; certain chain extenders may also provide neutralization. Examples include but are not limited to MXDA and dimethylethanol amine (DMEA); the neutralizing agent can also contribute to the barrier properties of the coating. In certain nonlimiting embodiments, the polyurethane is in solvent, and neutralization of any acid in the polyurethane molecule is not desired.

As noted above, the polyurethanes used in the coatings of the present invention comprise at least 30 weight percent of meta-substituted aromatic material. Weight percent is based on the total solid weight of the resin (i.e. polyurethane) itself. The meta-substituted aromatic material can be introduced in the polyester polyol, the isocyanate reacted with the polyester polyol to form the urethane, and/or any of the various chain extenders.

The polyurethane prepolymer of the present invention will typically have a weight average molecular weight in THF of 5000 to 30,000, such as 7000 to 25,000 or 10,000 to 15,000. The polyurethane when dispersed in water (i.e. the "polyurethane dispersion") will typically have a weight average molecular weight (in DMF) of 8000 to 200,000, such as 10,000 to 130,000 or 20,000 to 60,000. In certain nonlimiting embodiments, the polyurethane will have a Molar Permachor Number of at least 50.

In certain nonlimiting embodiments, it may be desired to use a meta-substituted aliphatic isocyanate, such as TMXDI, to form the polyurethane. Because certain aliphatic isocyanates deblock at a higher temperature than, for example, certain aromatic isocyanates, their use may be more suitable in, for example, molding or vulcanizing applications. Moreover, aliphatic isocyanates having an aromatic ring may contribute to barrier.

In certain nonlimiting embodiments, the polyurethane dispersion is comprised of a blend of two or more different polyurethanes. In these embodiments, there will be at least 30 weight percent of meta-substituted aromatic material based on the overall weight of polyurethane in the blend, but each polyurethane added to the blend may or may not have at least 30 weight percent of meta-substituted aromatic material. For example, a first polyurethane dispersion having, approximately 35 weight percent TDI and approximately 20 weight percent HER can be blended with a second polyurethane dispersion comprising approximately 20 weight percent TDI and zero percent HER.

The present barrier coatings further comprise an elastomeric material. "Elastomeric material" and like terms as used herein refer to materials that impart elasticity and/or flexibility: "Elasticity" and like terms refer to the ability of a material or substrate to return to its approximate original shape or volume after a distorting force has been removed. "Flexibility" and like terms refer to the ability of a material or substrate to return to its approximate original shape or volume after a mechanical force has been removed. Materials and substrates may be both flexible and elastomeric, or may be one or the other. Suitable elastomeric materials include but are not limited to acrylonitriles, such as epoxy terminated acrylonitriles and carboxyl terminated acrylonitrile, and acrylonitrile/diene copolymers, which again can be carboxyl terminated or epoxy terminated, of which butadiene acrylonitrile and acrylonitrile/diene copolymer, which again can be carboxyl terminated or epoxy terminated, and isoprene acrylonitrile are examples. "Acrylonitrile" as used herein generally refers to any compound having a C≡N linkage; and therefore includes diene/acrylonitrile copolymers, such as those described above. In certain nonlimiting embodiments, the elastomeric material has 20 weight percent of C≡N bonds. Other suitable elastomeric materials include but are not limited to natural and synthetic rubber, including cis-1,4-polyisoprene rubber, styrene/butadierie copolymers, polybutadiene rubber, styrene/isoprene/butadiene rubber, butyl rubber, halobutyl rubber; polyurethane elastomers, including elastomers based on both aromatic and aliphatic isocyanates; flexible polyolefins, including flexible polyethylene and polypropylene homopolymers and copolymers; styrenic thermoplastic elastomers; polyamide elastomers; polyamide-ether elastomers; ester-ether or ester-ester elastomers; flexible ionomers; thermoplastic vulcanizates; flexible poly(vinyl chloride) homopolymers and copolymers; flexible acrylic polymers;

and blends and alloys of these, such as poly(vinyl chloride) alloys like poly(vinyl chloride)-polyurethane alloys.

The polyurethane will contribute barrier properties to the present coatings, while the elastomeric material will contribute flexibility and/or elasticity to the coating. Accordingly, the amount of polyurethane and elastomeric material in the coatings can be determined based upon the needs of the user. For example, in certain embodiments, if good barrier is especially desired, the polyurethane will typically be present at 50 weight percent or higher.

In certain nonlimiting embodiments, the polyurethane and elastomeric material will be blended together. This can be done, for example, by a mechanical blend. In certain nonlimiting embodiments, the polyurethane will be in a water-based dispersion and will form a discontinuous phase in the elastomeric material, which is the continuous phase. The discontinuous polyurethane phase is believed to create a tortuous path similar to that of a high aspect ratio pigment, but without sacrificing flexibility and/or elasticity, although the inventors do not wish to be bound by this.

In certain nonlimiting embodiments, a copolymer comprising the polyurethane and elastomeric material will be used. The copolymer, it will be appreciated, can have portions comprising the elastomeric material that will have flexibility and/or elasticity, and portions comprising the polyurethane that will have barrier properties. A copolymer according to the present invention can be prepared, for example, by incorporating the elastomeric material into the backbone of the polyurethane such as by using the elastomeric material as a chain extender or through grafting off of the polyurethane by methods known in the art such as by reacting an epoxy-functional elastomeric material (ETBN) with acid or hydroxyls on the polyurethane.

In certain nonlimiting embodiments, the barrier coating of the present invention further comprises one or more additional polymers. The polymer(s) can be chosen to impart various properties and/or effects to the coating. For example, a polymer known to impart barrier can be used, such as polyvinylidene chloride (PVDC), copolymers of vinylidene chloride, EVOH, polyamides, and the like. Other polymers that function as adhesion promoters, flexibilizers, plasticizers and the like can also be used.

In certain nonlimiting embodiments, the present barrier coatings further comprise a pigment or other colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating of the present invention.

Example colorants include pigments, dyes and tints, such as those used in the paint industry and/or listed in the Dry Color Manufacturers Association (DCMA) as well as special effect compositions. A colorant may include, for example, a finely divided solid powder that is insoluble but wettable under the conditions of use. A colorant can be organic or inorganic and can be agglomerated or non-agglomerated.

As noted above the colorant can be in the form of a dispersion including, but not limited to, a nanoparticle dispersion. Nanoparticle dispersions can include one or more highly dispersed nanoparticle colorants or colorant particles that produce a desired visible color and/or opacity and/or visual effect. Nanoparticle dispersions can include colorants such as pigments or dyes having a particle size of less than about 150 nm, such as less than 70 nm, or less than 30 nm. Example nanoparticle dispersions and methods for making them are identified in U.S. Application Publication No. 2003/0125417, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Ser. No. 10/876,315 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Patent Application Publication No. 2003/0125416, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference. Composite polyester/nylon pigments, for example, can be incorporated into the present coatings and provide, for example, a good appearance without affecting flexibility; such pigments can also contribute to barrier. Suitable polyester/nylon pigments are commercially available from Teijin Fiber Limited, Osaka, Japan.

In certain nonlimiting embodiments, the pigment can be one having a high aspect ratio. Suitable high aspect ratio pigments include, for example, vermiculite, mica, talc, metal flakes, platy clays and platy silicas. High aspect ratio platelets or pigments may be present in coatings in amounts from above 0.1 to 20 weight percent of the barrier coating, such as from 1 to 10 weight percent, with weight percent based on the total solid weight of the coating. The high aspect ratio pigments may form a "fish-scale" arrangement within the coating, which provides a tortuous path for gases to pass through from one side of the coating to the other. Such platelets typically have diameters of from about 1 to about 20 microns, such as about 2 to 5 or 10 microns. The aspect ratio of the platelets is typically at least 5:1, such as at least 10:1 or 20:1. As particular examples, mica flakes may have an aspect ratio of about 20:1, talc may have an aspect ratio of about 10:1 to about 20:1 and vermiculite may have an aspect ratio of from about 200:1 to about 10,000:1. While high aspect ratio pigments contribute to barrier properties, if used in quantities that are too great, flexibility and/or elasticity may be sacrificed. Accordingly, the user will need to determine the appropriate amount of high aspect ratio pigment to use to get the desired properties of barrier and flexibility/elasticity. In certain nonlimiting. embodiments, a high aspect pigment will be ground and added directly to the polyurethane. The barrier coating composition of the present invention may optionally include other ingredients such as fillers, other than the pigments described above, extenders, UV absorbers, light stabilizers, plasticizers, surfactants and wetting agents. These optional ingredients, if used, may comprise up to 10 weight percent, with weight percent being based on the total solid weight of the barrier coating composition.

In certain nonlimiting embodiments, the present barrier coating and/or polyurethane may be water-based, such as in the form of an aqueous dispersion. The term "water-based" as used herein refers to a composition in which the carrier fluid of the composition is predominantly water on a weight percent basis, i.e., more than 50 weight percent of the carrier comprises water. The remainder of the carrier comprises less than 50 weight percent organic solvent, such as less than 25 weight percent or less than 15 weight percent. Based on the total weight of the barrier coating composition (including the carrier and solids), the water may comprise up to about 90 weight percent. In certain nonlimiting embodiments, the barrier coating composition may be substantially solvent-free. The term "substantially solvent-free" as used herein means that the barrier coating composition contains less than about 15 or 20 weight percent organic solvents, such as less than 5 or 10 weight percent, with weight percent being based on the total weight of the coating composition. For example, the coating composition may contain from 0 to 2 or 3 weight percent organic solvents.

In other nonlimiting embodiments of the present invention, the barrier coating and/or polyurethane may be solvent-based. The term "solvent-based" as used herein refers to a composition in which the carrier fluid is predominantly organic solvent on a weight percent basis; i.e., more than 50 weight percent of the carrier comprises organic solvent. Any compatible suitable organic solvent(s) can be used.

The barrier coating compositions may form a film by drying, as the coating may be cured at ambient or elevated temperature. Alternatively, the coating compositions may comprise crosslinkers that render the coatings thermosetting. Suitable crosslinkers include carbodiimides, aminoplasts, aziridines, zinc/zirconium ammonium carbonates and isocyanates. Water-based carbodiimides and isocyanates may be particularly suitable in some applications because they do not add a significant amount of organic solvent to the barrier coating composition. Aziridines might be particularly suitable in other applications. When a crosslinker is used, it is typically present in an amount of up to about 10 weight percent, such as 1 weight percent, based on the total solid weight of the barrier coating. In certain nonlimiting embodiments, use of a crosslinker can result in better barrier. It will be appreciated that when a crosslinker is used, the coating in the present invention may be thermoset, and when a crosslinker is not used, the coating of the present invention will be a thermoplast.

The present invention is further directed to a method for improving barrier on a substrate comprising applying to the substrate any of the barrier coating compositions described above. Any suitable substrate can be treated according to the present invention. Typically, the substrates will be those that have gas permeability, such as polymers, including but not limited to, polyesters, polyolefins, polyamides, cellulosics, polystyrenes, polyacrylics and polycarbonates. Poly(ethylene terephthalate), poly(ethylene naphthalate), and combinations thereof may be particularly suitable. Other typical substrates will be those that exhibit flexibility and/or elasticity. As noted above, it will be appreciated that a flexible substrate may or may not also be an elastic substrate. Examples of flexible substrates include nonrigid substrates, such as thermoplastic urethane, synthetic leather, natural leather, finished natural leather, finished synthetic leather, ethylene vinyl acetate foam, polyolefins and polyolefin blends, polyvinyl acetate and copolymers, polyvinyl chloride and copolymers, urethane elastomers, synthetic textiles and natural textiles. Elastic substrates include, for example, natural and synthetic rubbers.

In certain nonlimiting embodiments, the substrate comprises one or more sites of unsaturation. Examples include natural and synthetic rubbers.

Any of the barrier coating compositions described above can be applied to a substrate according to any method known in the art. For example, the coating can be applied by spraying, dipping, brushing, rolling and the like.

Following application, the coating can be cured by any suitable means.

As an alternative to curing the coating that has been applied to the substrate, in certain nonlimiting embodiments the coating and the substrate can be co-molded or covulcanized. In these nonlimiting embodiments, for example, the unsaturation in the elastomeric material would react with or covulcanize with unsaturation in the substrate, such as a "green" or uncured rubber. In certain nonlimiting embodiments, covulcanization may result in a better barrier than coating the substrate. "Covulcanization" and like terms refer to the process of chemically producing crosslinks or bonds between two or more materials, in this case the elastomeric material in the coating and the substrate. In certain nonlimiting embodiments wherein covulcanization is performed and a crosslinker is used in the coating, it will be appreciated that two "crosslinking" mechanisms occur—one between the elastomeric material and the substrate, and one between the functional groups on the polyurethane and the crosslinking agent.

Once cured, the coating on the substrate will typically have a dry film thickness of 0.1 to 20 mils, such as 0.5 to 10 or 1 to 2.

The coatings and methods of the present invention can be used for numerous end-use applications. Examples include but are not limited to athletic balls, such as soccer balls, basketballs, volleyballs, footballs, racquet balls, squash balls, beach balls, tennis balls, golf balls, baseballs, and the like; inflatable rafts; furniture, toys and the like; air mattresses; air bags; air shocks; bladders; emergency slides; life vests; medical equipment and devices, such as blood pressure bags, catheters, and the like; tires, such as bike tires, automobile tires, bike tubes, ultra terrain bike tires, motorcycle tires, lawn tractor tires and the like; balloons; air bladders or other footwear applications; packaging material, such as bottles, wraps, food or plastic sheets; hoses; garbage bags; plastic light bulbs; fire extinguishers; LED displays; plasma TV's; parachutes; scuba tanks; gas cylinders; flexible foam; rigid foam, other pipes, hoses, tubes and the like; architectural needs, such as windows, roofing, siding and the like; fiber optic cables; seals and gaskets; batteries; clothing and other textiles; swimming pool liners and covers; hot tubs; tanks; electronics; buckets and pails. Certain nonlimiting embodiments are directed to a rubber substrate covulcanized with any barrier coating described herein, wherein the coated substrate has an elongation at break of 200 percent or greater at 0° C. "Elongation at break" and like terms refer to the amount of elongation a coating can withstand prior to breaking or cracking. Elongation at break can be measured with an Instron machine. "Elongation at break" as reported herein is determined according to the method set forth in the examples.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Thus, while the invention has been described in terms of "a" polyurethane and "an" elastomeric material, more than one of each of these components can be used. Similarly, one or ore of any of the other additives described herein or standard in the art can be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

A polyester prepolymer was prepared in a four-neck round bottom flask equipped with an electronic temperature probe, mechanical stirrer, condenser, dry nitrogen sparge, and a heating mantle. The following ingredients were used:

| | |
|---|---|
| diethylene glycol | 3500.0 g |
| succinic anhydride | 4176.0 g |
| dibutyltin oxide | 15.0 g |

The ingredients were charged to the flask and the temperature was gradually increased to 210° C. over a four-hour period while stirring, sparging with nitrogen, and collecting the distillate. The reaction temperature was then held at 210° C. for 20 hours until the acid value dropped to 10.6 and 561 ml of distillate was collected. The final product was a dark orange liquid with a Gardner-Holdt viscosity of Z6+, an acid value of 10.6, a number average molecular weight (MN) of 1734, a weight average molecular weight ($M_W$) of 3394, and a nonvolatile content of 98.5% (measured at 110° C. for one hour).

Example 2

A polyurethane dispersion with TMXDI and 20 percent HER was prepared in a four-neck round bottom flask equipped with an electronic temperature probe, mechanical stirrer, condenser, nitrogen atmosphere, and a heating mantle. The following ingredients were used:

| Charge A | |
|---|---|
| dimethylolpropionic acid (DMPA) | 91.0 g |
| polyester pre-polymer of Example 1 | 364.0 g |
| 1,3-bis(2-hydroxyethoxy) benzene (or hydroxyethyl resorcinol, HER) | 254.8 g |
| Charge B | |
| tetramethylxylylene diisocyanate (TMXDI) | 300.0 g |
| Charge C | |
| methyl ethyl ketone | 695.8 g |
| dibutyltin dilaurate | 0.6 g |
| Charge D | |
| tetramethylxylylene diisocyanate (TMXDI) | 300.0 g |
| Charge E | |
| water | 2711.0 g |
| dimethylethanolamine | 40.3 g |
| meta-xylylene diamine (MXDA) | 16.1 g |
| Charge F | |
| methyl ethyl ketone | 50.0 g |

Charge A was stirred in the flask at a temperature of 130° C. for one hour and then cooled to 90° C. Charge B was added over a one-hour period and the mixture was then cooled to 80° C. Charge C was added over a one-hour period and the mixture was then cooled to 60° C. Charge D was added over a ten-minute period and the temperature of the mixture was then held at 80° C. for an additional six hours. Charge E was heated to 50° C. in a separate 12 liter four-neck round-bottom flask under a nitrogen atmosphere. 1500.0 g of the reaction product of Charges A, B, C, and D was added to Charge E over a ten-minute period followed by the addition of Charge F. The methyl ethyl ketone was removed by vacuum distillation at 50° C. The final dispersion had a Brookfield viscosity of 68 centipoise (spindle #1, 60 rpm), an acid value of 9.2, a pH of 7.7, and a nonvolatile content of 30.2% (measured at 110° C. for one hour).

Example 3

A polyurethane dispersion with TMXDI and no HER was prepared in a four-neck round bottom flask equipped with an electronic temperature probe, mechanical stirrer, condenser, nitrogen atmosphere, and a heating mantle. The following ingredients were used:

| Charge A | |
|---|---|
| dimethylolpropionic acid (DMPA) | 87.4 g |
| polyester pre-polymer of Example 1 | 814.2 g |
| Charge B | |
| tetramethylxylylene diisocyanate (TMXDI) | 175.0 g |
| Charge C | |
| methyl ethyl ketone | 674.2 g |
| dibutyltin dilaurate | 0.6 g |
| Charge D | |
| tetramethylxylylene diisocyanate (TMXDI) | 175.0 g |
| Charge E | |
| water | 2708.0 g |
| dimethylethanolamine | 41.0 g |
| meta-xylylene diamine (MXDA) | 16.1 g |
| Charge F | |
| methyl ethyl ketone | 50.0 g |

Charge A was stirred in the flask at a temperature of 130° C. for one hour and then cooled to 90° C. Charge B was added over a one hour period and the mixture was then cooled to 80° C. Charge C was added over a one hour period and the mixture was then cooled to 60° C. Charge D was added over a ten minute period and the temperature of the mixture was then held at 80° C. for an additional six hours. Charge E was heated to 50° C. in a separate 12 liter four-neck round-bottom flask under a nitrogen atmosphere. 1500.0g of the reaction product of Charges A, B, C, and D was added to Charge E over a ten minute period followed by the addition of Charge F. The methyl ethyl ketone was removed by vacuum distillation at 50° C. The final dispersion had a Brookfield viscosity of 68 centipoise (spindle #1, 60 rpm), an acid value of 9.2, a pH of 7.7, and a nonvolatile content of 30.2% (measured at 110° C. for one hour).

Example 4

A polyurethane dispersion with TDI and 20 percent HER was prepared in a four-neck round bottom flask equipped with an electronic temperature probe, mechanical stirrer, condenser, nitrogen atmosphere, and a heating mantle. The following ingredients were used:

| Charge A | |
|---|---|
| toluene diisocyanate (TDI) | 470.0 g |
| methyl ethyl ketone | 548.0 g |
| Charge B | |
| N-methyl pyrrolidinone | 84.0 g |
| dimethylolpropionic acid (DMPA) | 93.6 g |
| polyester pre-polymer of Example 1 | 582.4 g |
| 1,3-bis(2-hydroxyethoxy) benzene (or hydroxyethyl resorcinol, HER) | 270.0 g |
| Charge C | |
| methyl ethyl ketone | 40.0 g |
| Charge D | |
| methyl ethyl ketone | 105.0 g |
| Charge E | |
| water | 2173.1 g |
| dimethylethanolamine | 33.1 g |
| hydroxyethyl ethyleneurea (HEEU) | 69.6 g |
| meta-xylylene diamine (MXDA) | 17.3 g |
| Charge F | |
| methyl ethyl ketone | 75.0 g |

Charge A was stirred in the flask at a temperature of 75° C. Charge B was heated in a separate flask to a temperature of 90° C. and added to Charge A over a one hour period at a temperature of 80° C. Charge C was used to rinse the Charge B flask and then added to the reaction mixture. The reaction mixture was held at 80° C. for an additional three hours at which time Charge D was added. Charge E was heated to 50° C. in a separate 12 liter four-neck round-bottom flask under a nitrogen atmosphere. 1500.0g of the reaction product of Charges A, B, C, and D was added to Charge E over a ten-minute period followed by the addition of Charge F. The methyl ethyl ketone was removed by vacuum distillation at 50° C. The final dispersion had a Brookfield viscosity of 512 centipoise (spindle #2, 60 rpm), an acid value of 12.2, a pH of 7.1, and a nonvolatile content of 37.6% (measured at 110° C. for one hour).

Example 5

A polyurethane dispersion with TDI and no HER was prepared in a four-neck round bottom flask equipped with an electronic temperature probe, mechanical stirrer, condenser, nitrogen atmosphere, and a heating mantle. The following ingredients were used:

| Charge A | |
|---|---|
| toluene diisocyanate (TDI) | 193.0 g |
| methyl ethyl ketone | 377.0 g |
| Charge B | |
| N-methyl pyrrolidinone | 22.0 g |
| dimethylolpropionic acid (DMPA) | 64.0 g |
| polyester pre-polymer of Example 1 | 782.0 g |
| Charge C | |
| methyl ethyl ketone | 40.0 g |
| Charge D | |
| water | 1714.0 g |
| dimethylethanolamine | 26.2 g |
| hydroxyethyl ethyleneurea (HEEU) | 54.9 g |
| meta-xylylene diamine (MXDA) | 10.0 g |
| Charge E | |
| methyl ethyl ketone | 59.4 g |

Charge A was stirred in the flask at a temperature of 70° C. Charge B was heated in a separate flask to a temperature of 90° C. and added to charge A over a thirty minute period at a temperature of 80° C. Charge C was used to rinse the Charge B flask and then added to the reaction mixture. The reaction mixture was held at 80° C. for an additional five hours. Charge D was heated to 50° C. in a separate 12 liter four-neck round-bottom flask under a nitrogen atmosphere. 1188.0 g of the reaction product of Charges A, B, and C was added to Charge D over a ten-minute period followed by the addition of Charge E. The methyl ethyl ketone was removed by vacuum distillation at 50° C. The final dispersion had a Brookfield viscosity of 731 centipoise (spindle #3, 60 rpm), an acid value of 12.1, a pH of 6.6, and a nonvolatile content of 41.7% (measured at 110° C. for one hour).

Example 6

A coating according to the present invention was prepared as follows:

| Name | Weight |
| --- | --- |
| Polyurethane dispersion of Example 4 | 25.32 |
| Polyurethane dispersion of Example 5 | 22.45 |
| Both under agitation, stir together | |
| DARAN SL-143[1] | 51.49 |
| Neutralize to pH 6-6.5 with ammonia under agitation | |
| Add slowly to polyurethane dispersion mixture, stir 10 minutes | |
| LW-44[2] | 0.58 |
| Add under agitation, stir 5 minutes | |
| XHD-47J[3] | 0.16 |
| Add under agitation, stir 5 minutes | |
| TOTAL | 100.0 |

[1] PVDC terpolymer from Hampshire Corporation, Ammonia (KAR-5995)
[2] Associative thickener from Bayer Corporation.
[3] Defoamer from Ultra Additives.

The elongation and $P(O_2)$ of the coating were as follows:

| Elongation @ 25° C.[4] | $P(O_2)$[5] |
| --- | --- |
| 400% | 2.26 |

[4] Obtained from Instron measurement, in which a rectangular sample (½ inch wide, 3 inches long) is stretched at a rate of 20 inches per minute at the indicated temperature.
[5] Measured by Mocon equipment using Oxygen as test gas; unit is cc-mil/100 in$^2$-day-atm at 0% relative humidity.

Example 7

Rubber Substrate Condition: Cured (A) vs. Green (Uncured) (B)

Coatings were prepared as follows:

| Name | Weight | Weight |
| --- | --- | --- |
| Formulation | A | B |
| TYLAC 68073-06[6] | 33.59 | 35.26 |
| Stir and add the following | | |
| Polyurethane dispersion of Example 2 | 24.02 | 23.80 |
| Polyurethane dispersion of Example 3 | 24.18 | 24.06 |
| IGEPAL CO-630[7] | 0.29 | 0.30 |
| Sulfur Curing Package[8] | 1.53 | 1.60 |
| Deionized water | 8.71 | 9.14 |
| PARAGUM 265[9] | 5.33 | 3.36 |
| CX 100[10] | 2.34 | 2.48 |
| TOTAL | 100.00 | 100.00 |

[6] Carboxylated butadiene acrylonitrile polymer from Dow Reichhold Latex LLC.
[7] Surfactant: nonylphenoxy poly(ethyleneoxy)ethanol from Rhodia Inc.
[8] Sulfur curing package from Akron Dispersions, Inc.
[9] Sodium polyacrylate thickener from Para-Chem.
[10] Crosslinker from NeoResins Inc.

The elongation and $P(O_2)$ of the coating were as follows:

| | Elongation @ 25° C.[11] | $P(O_2)$[12] |
| --- | --- | --- |
| Formulation A: | 700 | 225 |
| Formulation B: | 700 | 76 |

[11] Obtained from Instron measurement, in which a rectangular sample (½ inch wide, 3 inches long) is stretched at a rate of 20 inches per minute at the indicated temperature.
[12] Measured by Mocon equipment using oxygen as test gas; unit is cc-mil/100 in$^2$-day-atm at 0 percent relative humidity.

All elongation and $P(O_2)$ readings were performed in this manner.

Example 8

Level of HER in PU 10% (A), 20% (B) and 0% (C)

Coatings were prepared as follows:

| Name | Weight | Weight | Weight |
| --- | --- | --- | --- |
| Formulation | A | B | C |
| TYLAC 68073-06 | 37.20 | 37.83 | 36.58 |
| Stir and add the following: | | | |
| Polyurethane dispersion of Example 2 | 26.31 | 53.53 | 0.00 |
| Polyurethane dispersion of Example 3 | 28.10 | 0.00 | 55.27 |
| IGEPAL CO-630 | 0.33 | 0.34 | 0.33 |
| Sulfur curing package | 1.72 | 1.75 | 1.69 |
| Deionized water | 0.00 | 0.00 | 0.00 |
| PARAGUM 265 | 3.71 | 3.76 | 3.65 |
| CX 100 | 2.63 | 2.78 | 2.49 |
| TOTAL | 100.00 | 100.00 | 100.00 |

The elongation and $P(O_2)$ of the coating were as follows:

| | Elongation[13] @ 25° C. | $P(O_2)$[14] | % Meta in the Polyurethane |
| --- | --- | --- | --- |
| Formulation A: | 450 | 83 | 37 |
| Formulation B: | 300 | 52 | 55 |
| Formulation C: | 400 | 144 | 21 |

[13] Obtained from Instron measurement, in which a rectangular sample (½ inch wide, 3 inches long) is stretched at a rate of 20 inches per minute at room temperature.
[14] Measured by Mocon equipment using oxygen as test gas; unit is cc-mil/100 in$^2$-day-atm at 0% relative humidity.

Example 9

Effect of Curing: no Sulfur Curing Package (A), no CX 100 (B), with Both Packages (C)

Coatings were prepared as follows:

| Name | Weight | Weight | Weight |
| --- | --- | --- | --- |
| Formulation | A | B | C |
| TYLAC 68073-06 | 34.11 | 34.40 | 33.59 |
| Stir and add the following: | | | |
| Polyurethane dispersion of Example 2 | 24.40 | 24.60 | 24.02 |
| Polyurethane dispersion of Example 3 | 24.56 | 24.76 | 24.18 |
| IGEPAL CO-630 | 0.29 | 0.30 | 0.29 |
| Sulfur curing package | 0.00 | 1.56 | 1.53 |
| Deionized water | 8.84 | 8.92 | 8.71 |
| PARAGUM 265 | 5.42 | 5.46 | 5.33 |
| CX 100 | 2.38 | 0.00 | 2.34 |
| TOTAL | 100.00 | 100.00 | 100.00 |

The elongation and P(O₂) of the coating were as follows:

| | Elongation @ 25° C. | P(O₂) |
|---|---|---|
| Formulation A: | 500 | 131 |
| Formulation B: | 700 | 155 |
| Formulation C: | 700 | 225 |

Example 10

Tylac level: 80% (A), 60% (B) and 40% (C)

Coatings were prepared as follows:

| Name | Weight | Weight | Weight |
|---|---|---|---|
| Formulation | A | B | C |
| TYLAC 68073-06 | 68.18 | 46.53 | 28.52 |
| Stir and add the following: | | | |
| Polyurethane dispersion of Example 2 | 11.95 | 21.75 | 30.00 |
| Polyurethane dispersion of Example 3 | 14.35 | 26.12 | 36.03 |
| IGEPAL CO-630 | 0.38 | 0.35 | 0.32 |
| Sulfur curing package | 3.15 | 2.15 | 1.32 |
| PARAGUM 265 | 1.40 | 2.03 | 2.34 |
| CX 100 | 0.59 | 1.07 | 1.48 |
| TOTAL | 100.00 | 100.00 | 100.00 |

The elongation and P(O₂) of the coating were as follows:

| | Elongation @ 25° C. | Elongation @ 0° C. | P(O₂) | % Meta in the Polyurethane |
|---|---|---|---|---|
| Formulation A: | 600 | 550 | 154 | 36 |
| Formulation B: | 400 | 100 | 52 | 36 |
| Formulation C: | 300 | 10 | 44 | 36 |

Whereas particular embodiments of this invention have been described above for purposes of illustration, it will be evident to those skilled in the art that numerous variations of the details of the present invention may be made without departing from the invention as defined in the appended claims.

What is claimed is:

1. A coated member comprising:
a single barrier layer comprising (i) a polyurethane composition comprising at least 30 weight percent of meta-substituted aromatic material, wherein weight percent is based on the total solid weight of the polyurethane composition, and (ii) an elastomeric material comprising at least one of acrylonitrile, natural rubber, synthetic rubber, polyolefin elastomer, polyamide elastomer, ester-ether elastomer, ester-ester elastomer, thermoplastic vulcanizate, poly(vinyl chloride) homopolymer, poly(vinyl chloride) copolymer, acrylic polymer, blends of two or more thereof, and alloys of two or more thereof, and wherein the barrier layer is the sole barrier layer on the coated member, wherein said polyurethane composition and said elastomeric material are incorporated together in said single barrier layer, and wherein the meta-substituted aromatic material comprises m-xvlylenediamine and bis(2-hydroxyethyl) ether of resorcinol, and optionally at least one of toluene diisocyanate, tetramethylxvlvlene diisocyanate and isophthalic acid.

2. The coated member of claim 1, wherein the polyurethane composition comprises a carrier fluid comprising greater than 50 weight percent of water, based on weight of the carrier fluid.

3. The coated member of claim 1, wherein the polyurethane composition comprises a carrier fluid comprising greater than 50 weight percent of organic solvent, based on weight of the carrier fluid.

4. The coated member of claim 1, wherein the polyurethane comprises a polyester polyol having a Molar Permachor Number of at least 35, and wherein said polyester polyol is prepared from ether polyols, and at least one of a dicarboxylic acid and an anhydride.

5. The coated member of claim 1, wherein the polyurethane has a Molar Permachor Number of at least 50.

6. The coated member of claim 1, wherein the elastomeric material comprises acrylonitrile.

7. The coated member of claim 1, wherein the polyurethane and elastomeric material are blended.

8. The coated member of claim 1, wherein the polyurethane and elastomeric material are copolymerized.

9. The coated member of claim 1, further comprising a crosslinker.

10. The coated member of claim 1, wherein the polyurethane composition comprises a blend of two or more polyurethane dispersions.

11. The coated member of claim 1, further comprising one or more polymers that impart additional barrier to the barrier layer.

12. The coated member of claim 1, further comprising a colorant.

13. The coated member of claim 1, further comprising a high aspect ratio pigment.

14. The coated member of claim 12, wherein the colorant is a composite polyester/nylon pigment.

15. A method for improving barrier on a substrate, comprising applying to the substrate the single barrier layer of claim 1 thereby forming a coated substrate comprising said single barrier layer, wherein said single barrier layer is the sole barrier layer on the coated substrate.

16. The method of claim 15, wherein the substrate is a flexible substrate.

17. The method of claim 15, wherein the substrate is an elastic substrate.

18. A method for coating a substrate comprising applying to a substrate the single barrier layer of claim 1 thereby forming a coated substrate comprising said single barrier layer, and covulcanizing the substrate and the single barrier layer, wherein bonds are formed between the elastomeric material of the single barrier layer and the substrate during covulcanization, wherein said single barrier layer is the sole barrier layer on the coated substrate.

19. The method of claim 18, wherein the coated substrate has an elongation at break of 200 percent or greater at a temperature of 0° C.

20. The coated member of claim 1, wherein the polyurethane composition is in the form of a dispersion comprising a carrier fluid comprising greater than 50 weight percent of water, based on weight of the carrier fluid, and said dispersion forming a discontinuous phase in the elastomeric material.

* * * * *